(No Model.)
L. DOTY.
FEED BOX FOR ANIMALS.
No. 311,880. Patented Feb. 10, 1885.
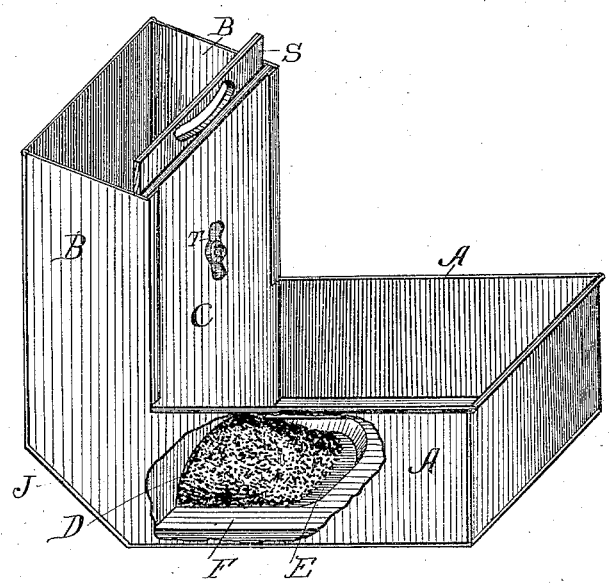
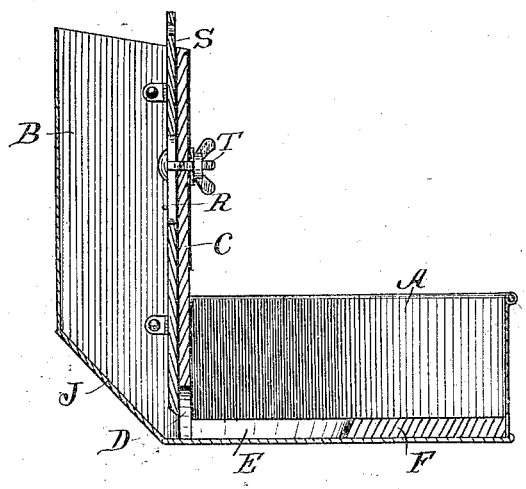
Witnesses.
Thos. H. Hutchins.
Wm. J. Hutchins.
Inventor.
Levi Doty

UNITED STATES PATENT OFFICE.

LEVI DOTY, OF FRANKFORT, ILLINOIS.

FEED-BOX FOR ANIMALS.

SPECIFICATION forming part of Letters Patent No. 311,880, dated February 10, 1885.

Application filed August 4, 1884. (No model.)

*To all whom it may concern:*

Be it known that I, LEVI DOTY, a citizen of the United States of America, residing at Frankfort, in the county of Will and State of Illinois, have invented certain new and useful Improvements in Feed-Boxes for Animals, of which the following is a specification, reference being had therein to the accompanying drawings.

Figure 1 is a perspective view, and Fig. 2 is a central vertical longitudinal sectional view.

This invention relates to certain improvements in feed-boxes for animals, whereby the animal is prevented from wasting the feed by throwing it out of the box and from eating too fast by having too great a quantity in sight or easy of access.

Referring to the drawings, A is the feed-box proper. B is the feed holder or receptacle for holding either grain, ground feed, or cut feed, and is separated from the feed-box proper by means of the partition C, having its lower end cut away in the form of an arch to permit the feed from the receptacle B to enter the feed-box A, as may be needed by the animal. A slide, S, on the back side of the partition C furnishes means for arbitrarily regulating the supply of feed from the receptacle B to the feed-box A. A thumb-screw, T, fixed stationary in the partition C, and having its bolt pass through slot R in said slide S, furnishes means for setting the slide S and holding it at any place desired, so as to open or close the opening D through partition C as much or little as may be desired. The floor of receptacle B is inclined, as shown at J, to throw the feed forward, so it may enter the feed-box. The discharge opening D in the lower end of the partition C is located at its center, and does not extend the entire width of the feed-box, for the purpose of confining the discharge of grain through it to the center of the feed-box, so the animal will not be as liable to throw the grain over the sides of the feed-box. The bottom of the feed-box is provided with a removable bottom, F, in which is formed a feed-recess, E, corresponding in width with the feed-opening D in said partition, for the purpose of assisting to confine the grain at that place. The removable bottom F is intended to be of sufficient thickness so that the recess E will form a pocket deep enough to prevent the flow of grain from the feed-receptacle B from extending over the entire bottom of the feed-box A, the remainder of the bottom being intended to catch the droppings from the animal's mouth.

It is a great improvement to construct the device so as to confine the grain at a point at the center of the feed-box, and to have the bottom F removable, so it can be replaced when worn, or with others of different thicknesses to suit different animals, and also to protect the permanent bottom of the feed-box A from the constant wear caused by the animal eating from it.

Having thus described my invention, what I claim as new, and desire to secure by Letters Patent, is as follows, to wit:

A feed-box for animals, constructed as described, consisting of the feed-receptacle B, having the adjustable slide S and partition C, having the central discharge-opening, D, at its lower end, feed-box A, and removable bottom F, having the feed-recess E, corresponding in width with said discharge-opening D, all adapted to operate substantially as set forth.

LEVI DOTY.

Witnesses:
THOS. H. HUTCHINS,
WM. J. HUTCHINS.